United States Patent
Barkan et al.

(10) Patent No.: US 11,960,959 B1
(45) Date of Patent: Apr. 16, 2024

(54) LOCATION BASED VISION CAMERA APPLICATION SETTINGS FOR HANDHELD SCANNERS

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 55 days.

(21) Appl. No.: 17/958,077

(22) Filed: Sep. 30, 2022

(51) Int. Cl.
G06K 7/10 (2006.01)

(52) U.S. Cl.
CPC ..... *G06K 7/10722* (2013.01); *G06K 7/10881* (2013.01); *G06K 2007/10524* (2013.01)

(58) Field of Classification Search
None
See application file for complete search history.

(56) References Cited

U.S. PATENT DOCUMENTS

| | | | | |
|---|---|---|---|---|
| 2009/0321525 A1* | 12/2009 | Barkan | ............. | G06K 7/109 235/472.01 |
| 2010/0019882 A1* | 1/2010 | Stern | ............. | G06K 7/0008 340/10.1 |
| 2014/0246496 A1* | 9/2014 | Brock | ............. | G06K 7/10821 235/472.01 |

* cited by examiner

*Primary Examiner* — Kristy A Haupt
(74) *Attorney, Agent, or Firm* — Yuri Astvatsaturov

(57) ABSTRACT

Imaging devices, systems, and methods for identifying an operation mode of an imaging device and processing imaging data based on the operation mode are described herein. An example device includes: a first imager operable to receive light from a first field of view (FOV) and configured to capture a first imager stream, a second imager operable to receive light from a second FOV and configured to capture a second imager stream, and a vision application processor that: processes at least a portion of the first imager stream and at least a portion of the second imager stream based on at least one of a commencement of a read session, a trigger event, or a decode event; and processes the second imager stream without regard to any of the read session, the trigger event, or the decode event, and process the first imager stream based on the second imager stream.

31 Claims, 12 Drawing Sheets

LOCATION BASED VISION CAMERA APPLICATION SETTINGS FOR HANDHELD SCANNERS

BACKGROUND

Barcode reading systems have long been used to capture barcode data, which is then used to look up the price of the item read. Barcode reading is traditionally performed with monochromatic imaging. However, barcode reading systems also often utilize machine vision techniques to improve scanning and/or perform related tasks, such as item and/or characteristic recognition. As such, digital or camera based barcode imagers may be further used for such machine vision purposes. However, a user may utilize the barcode reading system differently depending on the purpose, leading to inefficiencies in analyzing the captured image data. As such, a system that is able to identify an operation mode of an imaging device and process captured image data accordingly is desired.

SUMMARY

In an embodiment, a identifying an operation mode of an imaging device and processing imaging data based on the operation mode is provided. The system includes: an imaging device configured to operate in at least a handheld mode and a presentation mode, the imaging device including: a housing; and an imaging assembly at least partially disposed within the housing, the imaging assembly including: (a) a first imager operable to receive light from a first field of view (FOV) and configured to capture a first imager stream, and (b) a second imager operable to receive light from a second FOV and configured to capture a second imager stream. The system further includes a vision application processor and computer-readable media storing machine readable instructions that, when executed, cause the vision application processor to: (i) when the imaging device operates in the handheld mode: process at least a portion of the first imager stream and at least a portion of the second imager stream based on at least one of a commencement of a read session, a trigger event, or a decode event; and (ii) when the imaging device operates in the presentation mode: process the second imager stream without regard to any of the read session, the trigger event, or the decode event, and process the first imager stream based on the second imager stream.

In a variation of the embodiment, (a) processing at least the portion of the first imager stream and at least the portion of the second imager stream includes: causing the first imager and the second imager to activate based on the at least one of the commencement of the read session, the trigger event, or the decode event; (b) processing the second imager stream includes: causing the second imager to activate without regard to any of the read session, the trigger event, or the decode event; and (c) processing the first imager stream includes: causing the first imager to activate based on the second imager stream.

In another variation of the embodiment, (a) processing at least the portion of the first imager stream and at least the portion of the second imager stream includes at least one of: receiving a first set of frames representative of at least the portion of the first imager stream from the first imager and a second set of frames representative of at least the portion of the second imager stream from the second imager, or generating the first set of frames based on at least the portion of the first imager stream and the second set of frames based on at least the portion of the second imager stream; (b) processing the second imager stream includes at least one of: receiving the second set of frames representative of the second imager stream from the second imager, or generating the second set of frames based on the second imager stream; and (c) processing the first imager stream includes at least one of: receiving the first set of frames representative of the first imager stream from the first imager, or generating the first set of frames based on the first imager stream.

In yet another variation of the embodiment, the processing at least the portion of the first imager stream and at least the portion of the second imager stream includes processing all frames received by the vision application processor during a duration dependent on the at least one of the commencement of the read session, the trigger event, or the decode event.

In still yet another variation of the embodiment, processing at least the portion of the first imager stream and at least the portion of the second imager stream includes: receiving, from the second imager, the second imager stream; and cropping the second imager stream to generate at least the portion of the second imager stream.

In another variation of the embodiment, processing at least a portion of the first imager stream and at least a portion of the second imager stream based on at least one of a commencement of a read session, a trigger event, or a decode event includes: processing one or more frames that coincide with at least one of: (a) the read session, (b) the decode event, (c) a wakeup event, (d) a first predetermined timeframe beginning with the trigger event, or (e) a second predetermined timeframe beginning prior to the trigger event and including the trigger event.

In yet another variation, processing at least a portion of the first imager stream and at least a portion of the second imager stream based on at least one of a commencement of a read session, a trigger event, or a decode event includes: receiving an indication of the at least one of the commencement of the read session, the trigger event, or the decode event; responsive to receiving the indication, analyzing the first imager stream to determine whether the first imager stream includes sufficient information to identify an object in the first FOV; and responsive to determining that the first imager stream does not include sufficient information to identify the object, analyzing one or more frames of the second predetermined timeframe, the one or more frames captured prior to the trigger event In still yet another variation, the imaging device further operates in at least one of: a theft prevention mode, a facial recognition mode, a signal identification mode, an idle mode, an out-of-range mode, or an RFID tag mode.

In another variation, the machine readable instructions include instructions that, when executed, cause the vision application processor to further: (iii) when the imaging device operates in at least one of the theft prevention mode, the facial recognition mode, the signal identification mode, or the idle mode: process the second imager stream without regard to any of the read session, the trigger event, or the decode event.

In yet another variation, the imaging device operates in the idle mode and the machine readable instructions include instructions that, when executed, cause the vision application processor to further: determine whether an object passes through the second FOV without a scan event occurring.

In still yet another variation, the imaging device operates in the theft prevention mode, and the machine readable instructions include instructions that, when executed, cause the vision application processor to further: determine, based on the second imager stream, that the imaging device is in motion; and responsive to the determining that the imaging device is in motion, cause the imaging device to increase at least one of: (a) a framerate for the second imager stream or (b) a wireless signal range for the imaging device.

In another variation, (a) processing the second imager stream includes: identifying a barcode associated with an object visible in the second FOV; and (b) processing the first imager stream based on the second imager stream includes: responsive to the identifying, causing the first imager to begin capturing the first imager stream.

In yet another variation, processing the first imager stream based on the second imager stream further includes: receiving one or more frames of the first imager stream, wherein the one or more frames include the barcode of the object in the first FOV; decoding the barcode; and determining whether the object visible in the second FOV matches a reference associated with the barcode.

In still yet another variation, the machine readable instructions include instructions that, when executed, cause the vision application processor to further: (iii) when the imaging device operates in at least one of the out-of-range mode or the RFID tag mode: process at least the portion of the first imager stream based on the at least one of the commencement of the read session, the trigger event, or the decode event.

In another variation, the imaging device operates in the out-of-range mode and the machine readable instructions include instructions that, when executed, cause the vision application processor to further: refrain from processing frames from the second imager stream.

In yet another variation, refraining from processing frames includes: causing the second imager to refrain from capturing the second imager stream while the imaging device is operating in the out-of-range mode.

In still yet another variation, the machine readable instructions include instructions that, when executed, cause the vision application processor to further: detect that the imaging device is operating in the presentation mode responsive to receiving at least one of: (a) an indication via a magnetic sensor that the imaging device is in a cradle associated with the second imaging sensor; (b) an indication via a charging system that the imaging device is in a charging state; or (c) an indication via a capacitive touch sensor that a user is not holding the imaging device; and the processing the second imager stream is responsive to the detecting.

In another variation, the machine readable instructions include instructions that, when executed, cause the vision application processor to further: detect that the imaging device is operating in the handheld mode responsive to receiving at least one of: (i) an indication via a magnetic sensor that the imaging device is not in a cradle associated with the second imaging sensor; (ii) an indication via a charging system that the imaging device is not in a charging state; or (iii) an indication via a capacitive touch sensor that a user is holding the imaging device; and the processing at least the portion of the first imager stream and at least the portion of the second imager stream is after the detecting.

In another embodiment, an imaging device configured to operate in at least a handheld mode and a presentation mode and capable of processing imaging data based on an operation mode of the imaging device. The imaging device includes: a housing; an imaging assembly at least partially disposed within the housing, the imaging assembly including: (a) a first imager operable to receive light from a first field of view (FOV) and configured to capture a first imager stream, and (b) a second imager operable to receive light from a second FOV and configured to capture a second imager stream; and a vision application processor and computer-readable media storing machine readable instructions that, when executed, cause the vision application processor to: (i) when the imaging device operates in the handheld mode: process at least a portion of the first imager stream and at least a portion of the second imager stream based on at least one of a commencement of a read session, a trigger event, or a decode event; and (ii) when the imaging device operates in the presentation mode: process the second imager stream without regard to any of the read session, the trigger event, or the decode event, and process the first imager stream based on the second imager stream.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
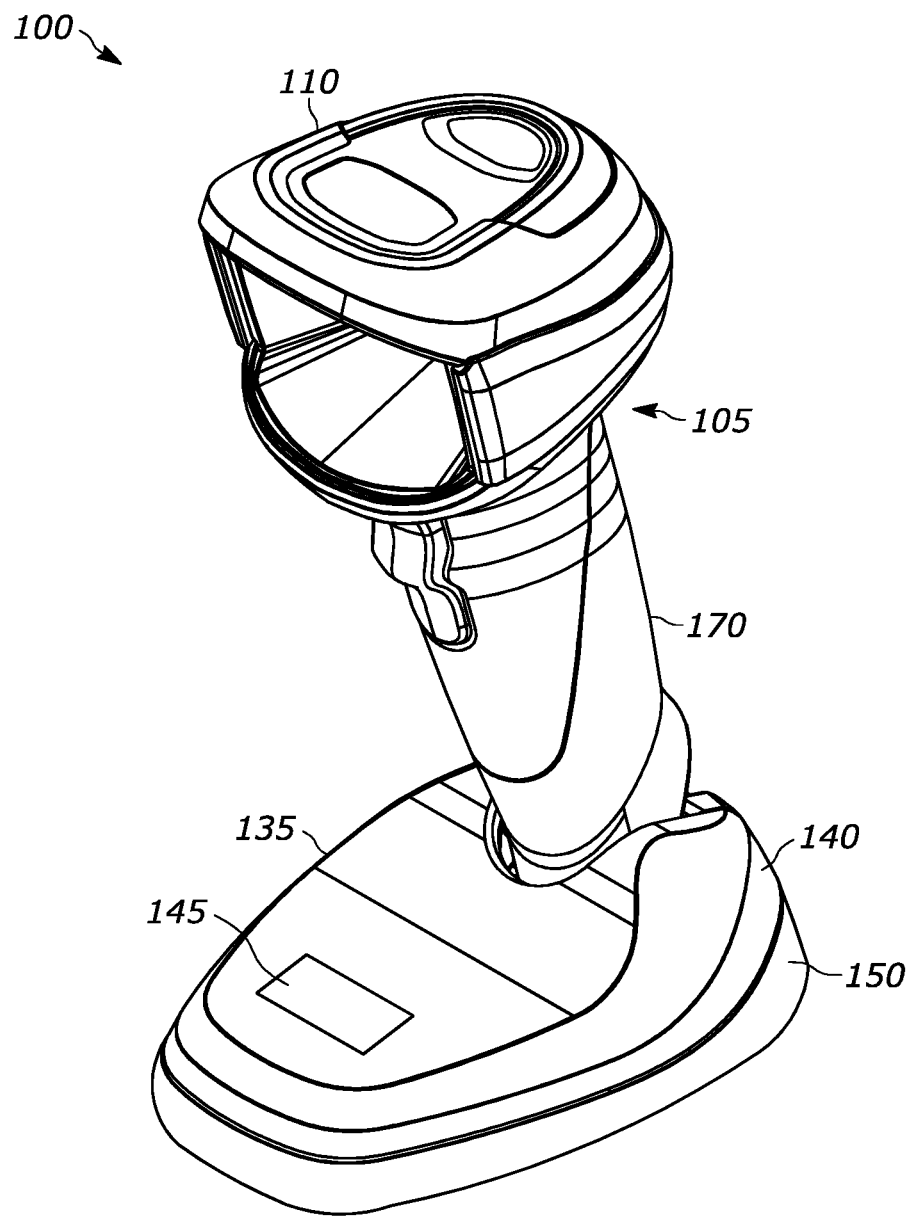
FIG. 1A illustrates a perspective view of a first example handheld barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some modern barcode readers incorporate both monochromatic imaging sensors (referred to herein as "imagers")

for reading barcodes and color imagers for machine vision purposes. However, while the incorporation of both forms of sensor increases the variety of use cases for such barcode readers, they often do not include a mechanism to detect the transition between different modes of usage and modify the operation of the barcode reader accordingly. As such, despite the differences in how a user utilizes the barcode readers, traditional barcode readers lack efficiency in the differing forms of processing for different functionalities.

In particular, a vision application running on the barcode reader would not necessarily know whether the scanner is in a fixed position (e.g., such as in a cradle, smart stand, base, etc.), or being moved around in a handheld mode. As such, the effectiveness of different vision applications is limited by the particular use case. A vision application processor or computing device communicatively coupled to the barcode reader and utilizing the techniques described herein, then, processes the imaging data differently depending on the operation mode. In some implementations, the vision application processor or computing device runs different applications and/or causes the imagers to start or stop capturing data depending on the operation mode.

The example handheld barcode readers disclosed herein include a number of different operation modes. In particular, the handheld barcode readers include a presentation (e.g., hands-free) mode and a handheld mode. Similarly, the handheld barcode readers may include a theft prevention mode, a facial recognition mode, a signal identification mode, an idle mode, an out-of-range mode, an RFID tag mode, etc.

The example handheld barcode readers and handheld barcode reader assemblies disclosed herein include a vision camera, that, depending on the operation mode and/or the configuration of the handheld barcode reader in question, can be used to address typical loss prevention issues, such as sweethearting, ticket switching, scan avoidance, etc. The vision camera can be placed in the base portion of a handheld barcode reader, in a base that receives and supports a handheld barcode reader, or in an adapter that can be attached to a handheld barcode reader or a cradle that receives and supports a handheld barcode reader.

When used in a retail environment, the vision camera can be configured to view a large portion of the checkout area when the handheld barcode scanner is in a presentation mode, idle mode, etc., including the entire space around the counter and a standing or seated users face, in order to monitor for loss prevention and other applications, such as facial recognition, etc. These handheld barcode readers and handheld barcode reader assemblies can also be useful in other environments, such as stock management and deterring theft of the reader. For example, the handheld barcode readers and handheld barcode reader assemblies can be operated such that only the barcode scanning module is used to save power while taking stock, or such that only the vision camera is used to increase power supplied and signal to the device while transmitting images of a bad-faith actor.

The vision camera can be used to determine whether or not a handheld barcode reader is seated in a base or cradle (e.g., to automatically switch from a hands fee mode of operation to a handheld mode of operation). The vision camera can also be used detect if a user leaves the field-of-view of the vision camera and the handheld barcode reader is not returned to the base or cradle. This can trigger an alert that either the handheld barcode reader needs to be charged or may have been stolen or misplaced. The vision camera can also be used to detect if a face of a user is within a FOV and, if a face is detected, the controller can dim the illumination of the barcode reading module to prevent eye annoyance while the handheld barcode scanner is in a hands-free operational mode.

With a vision camera having a wide field-of-view (e.g., 100 degrees), the handheld barcode reader or handheld barcode reader assembly could potentially be positioned such that the vision camera can see both the customer and the cashier standing to either side of the counter. In this case, specific interactions between both customer and cashier could be monitored, such as when the customer hands cash over cash, credit card, or coupons to a cashier, and receives them back, or when a cashier hands the customer a receipt. Alerts could be triggered, for example, if the cashier forgets to hand the credit card back to the user or if the cashier forgets to give the receipt to the customer.

The vision camera can also be mounted within the handheld barcode reader or the base on an adjustable arm, in a ball joint or gimbal, or on a positionable bracket so that the vision camera can be aimed to best cover the checkout area layout specific to a particular environment. Different environments may require different orientations of the handheld barcode reader or base. In some applications, the vision camera may be aimed at the customer when in hands-free mode or at the cashier. In other applications, the handheld barcode reader or handheld barcode reader assembly can be positioned sideways between the cashier and customer. With adjustability, the vision camera can be aimed differently, depending on how the handheld barcode reader or handheld barcode reader assembly is sitting. The vision camera could also be tilted higher or lower in cases where the handheld barcode reader or handheld barcode reader assembly is mounted on a cart on wheels to better take pictures of the patient. The mechanism could also be locked into the desired position, so it is not easily changed.

Figure 1B:
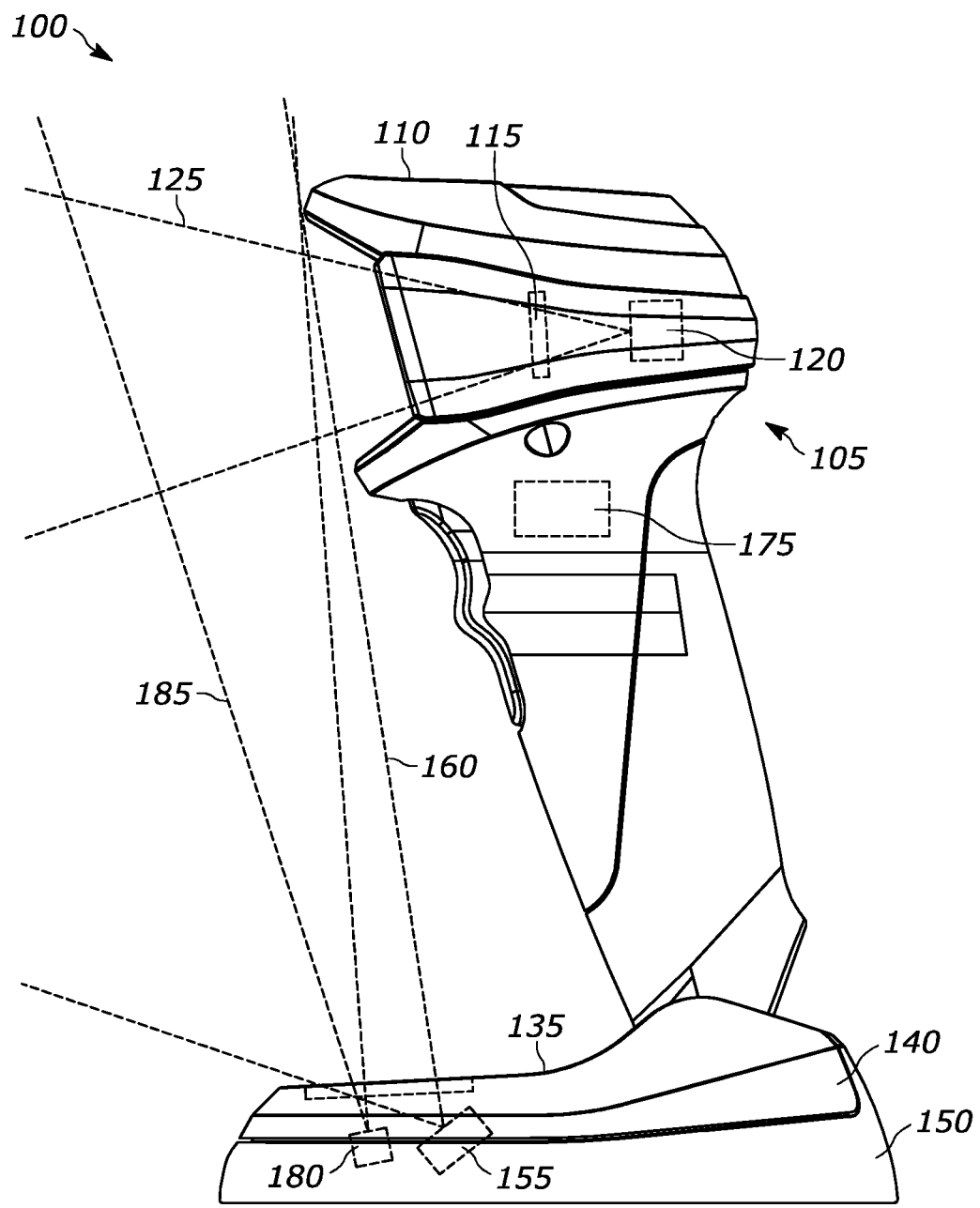
FIG. 1B illustrates a side view of the handheld barcode reader of FIG. 1A.
Figure 1C:
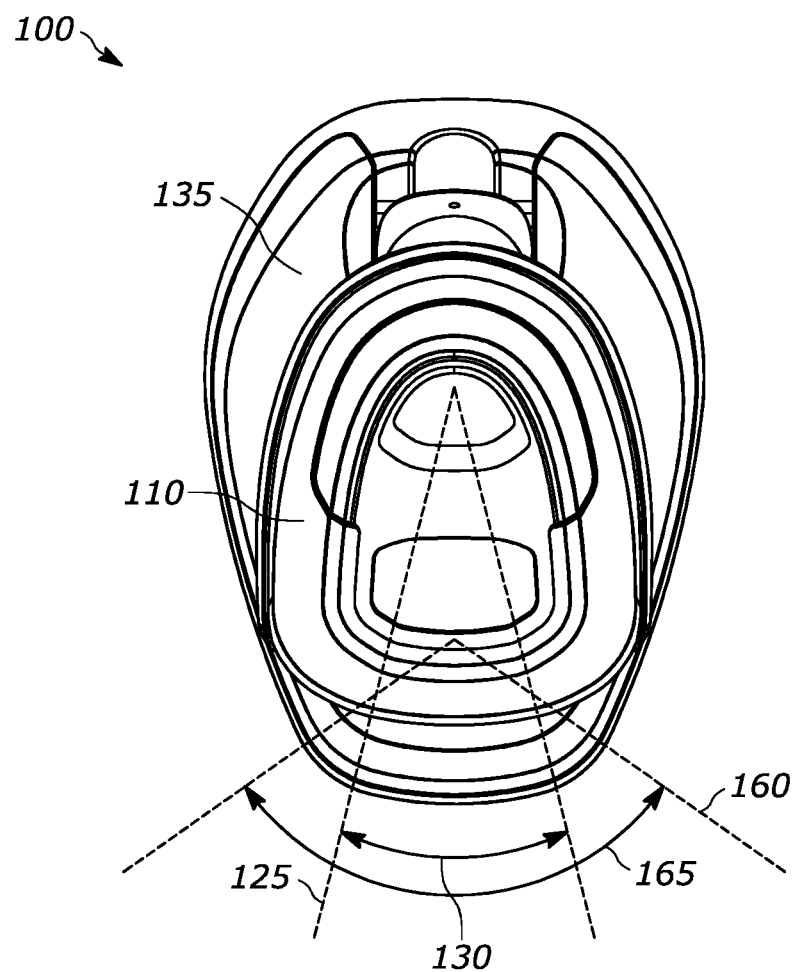
FIG. 1C illustrates a top view of the handheld barcode reader of FIG. 1A.

Referring to FIGS. 1A-1C, a first example handheld barcode reader 100 is illustrated. Handheld barcode reader 100 generally includes a housing 105 having a head portion 110 and a base portion 135. Base portion 135 includes an upper portion 140, a lower portion 150 removably attached to upper portion 140, and a base window 145 formed in upper portion 140. While lower portion 150 is shown as being separable from upper portion 140 in a horizontal direction, the separation between lower portion 150 and upper portion 140 could be vertical or in any other direction appropriate for a particular application. In the particular example shown, housing 105 also has a handle portion 170 positioned between head portion 110 and base portion 135 and configured to be grasped by the hand of a user.

A vision camera 155 is positioned within base portion 135 and has a first field-of-view (FOV) 160 that is directed out of base window 145 in upper portion 140 of base portion 135. Preferably, an area adjacent a front of handle portion 170 (e.g., within 10 mm of the front of handle portion 170 or within a finger's width of the front of handle portion 170) is visible in first FOV 160, which can be used to determine if a user is gripping handle portion and possibly switch handheld barcode reader 100 between a hands-free presentation mode and a handheld scanning mode based on vision camera 155 detecting the presence or absence of the hand of the user within first FOV 160. In the example shown, vision camera 155 is configured to capture images to perform functions such as facial recognition, gesture recognition, product identification, scan avoidance, ticket switching, etc., and is not configured to capture images for decoding barcodes.

A barcode reading module 120 is positioned at least partially in head portion 110 and has a second FOV 125 that is directed through a scan window 115 in head portion 110 and can at least partially overlap first FOV 160. Depending on the implementation, the barcode reading module 120 and the vision camera 155 may utilize the same lens assembly and/or the same imaging sensor. In other implementations, the barcode reading module 120 and the vision camera 155 may utilize different imaging sensors, such as a monochromatic sensor and a color sensor, respectively.

A controller 175 is also positioned within housing 105 and is in communication with barcode reading module 120 and vision camera 155. Controller 175 is configured to decode process signals from barcode reading module 120 from barcodes that are read by barcode reading module 120 and to receive and process images captured by and received from vision camera 155 for processes that do not include barcode reading, as discussed above. In some implementations, controller 175 is also configured to synchronize barcode reading module 120 and vision camera 155 so that vision camera 155 does not capture images when barcode reading module 120 is active or so that both vision camera 155 and barcode reading module 120 capture images in tandem, depending on the implementation. Controller 175 can synchronize barcode reading module 120 and vision camera 155 based on images captured by vision camera 155 or handheld barcode reader 100 could have an optical sensor 180 that is positioned in base portion 135, is in communication with controller 175, and has a third FOV 185 that at least partially overlaps second FOV 125 of barcode reading module 120 to determine when barcode reading module 120 is active. Controller 175 can then be configured to receive signals from optical sensor 180 indicating whether or not barcode reading module 120 is active and synchronize vision camera 155 and barcode reading module 120 based on the signals received from optical sensor 180. Alternatively, controller 175 could be configured to synchronize vision camera 155 and barcode reading module 120 to activate simultaneously so that vision camera 155 can use the same illumination as barcode reading module 120.

As best shown in FIG. 1C, first FOV 160 of vision camera 155 has a horizontal viewing angle 165 that is larger than the horizontal viewing angle 130 of second FOV 125 of barcode reading module 120. For example, horizontal viewing angle 165 of first FOV 160 could be between 80 degrees and 120 degrees and is preferably 100 degrees. In addition, horizontal viewing angle 130 of second FOV 125 could be between 40 degrees and 60 degrees. With horizontal viewing angle 165 of first FOV 160 of vision camera 155 being wider than horizontal viewing angle 130 of second FOV 125 of barcode reading module 120, vision camera 155 can be used as a wake-up system and controller 175 can be configured to turn on barcode reading module 120 when an object is detected in first FOV 160 of vision camera 155, before the object reaches second FOV 125 of barcode reading module 120. This allows barcode reading module 120 to be active as the object enters second FOV 125 and allows more time for barcode reading module 120 to read and decode a barcode on the object.

Figure 2:
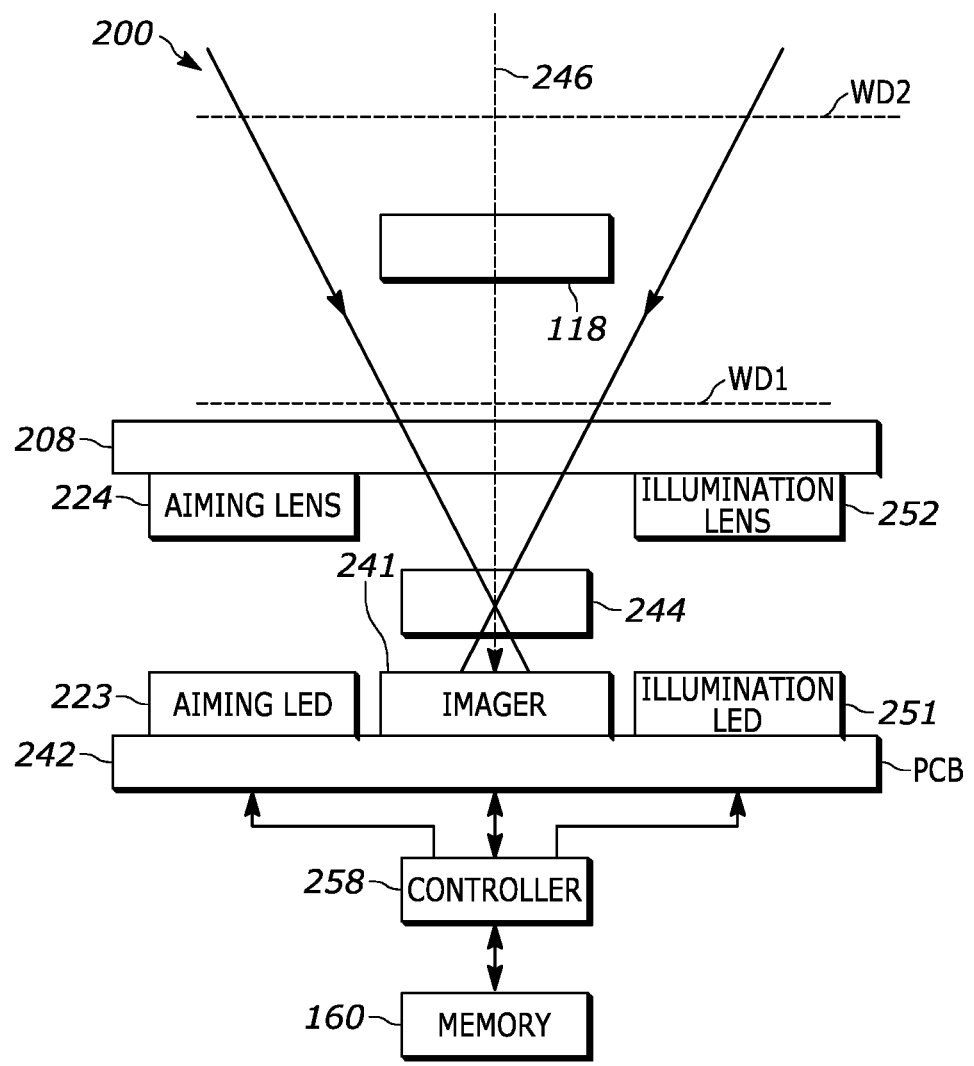
FIG. 2 illustrates a block diagram of an example imaging device such as the example handheld barcode reader of FIG. 1A.
Figure 3A:
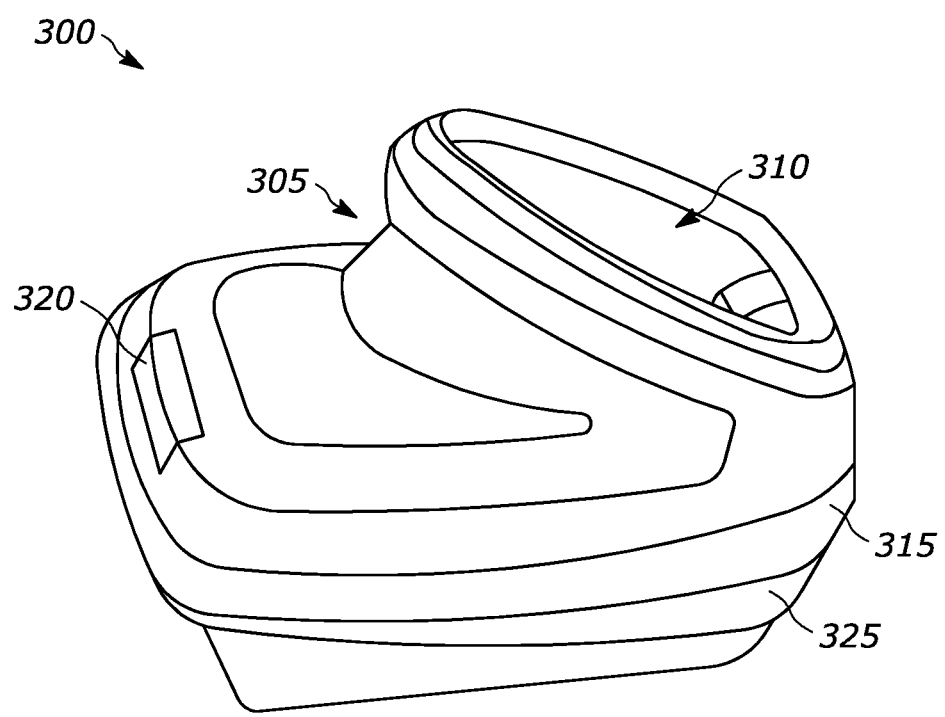
FIG. 3A illustrates a perspective view of an example barcode reader cradle.
Figure 3B:
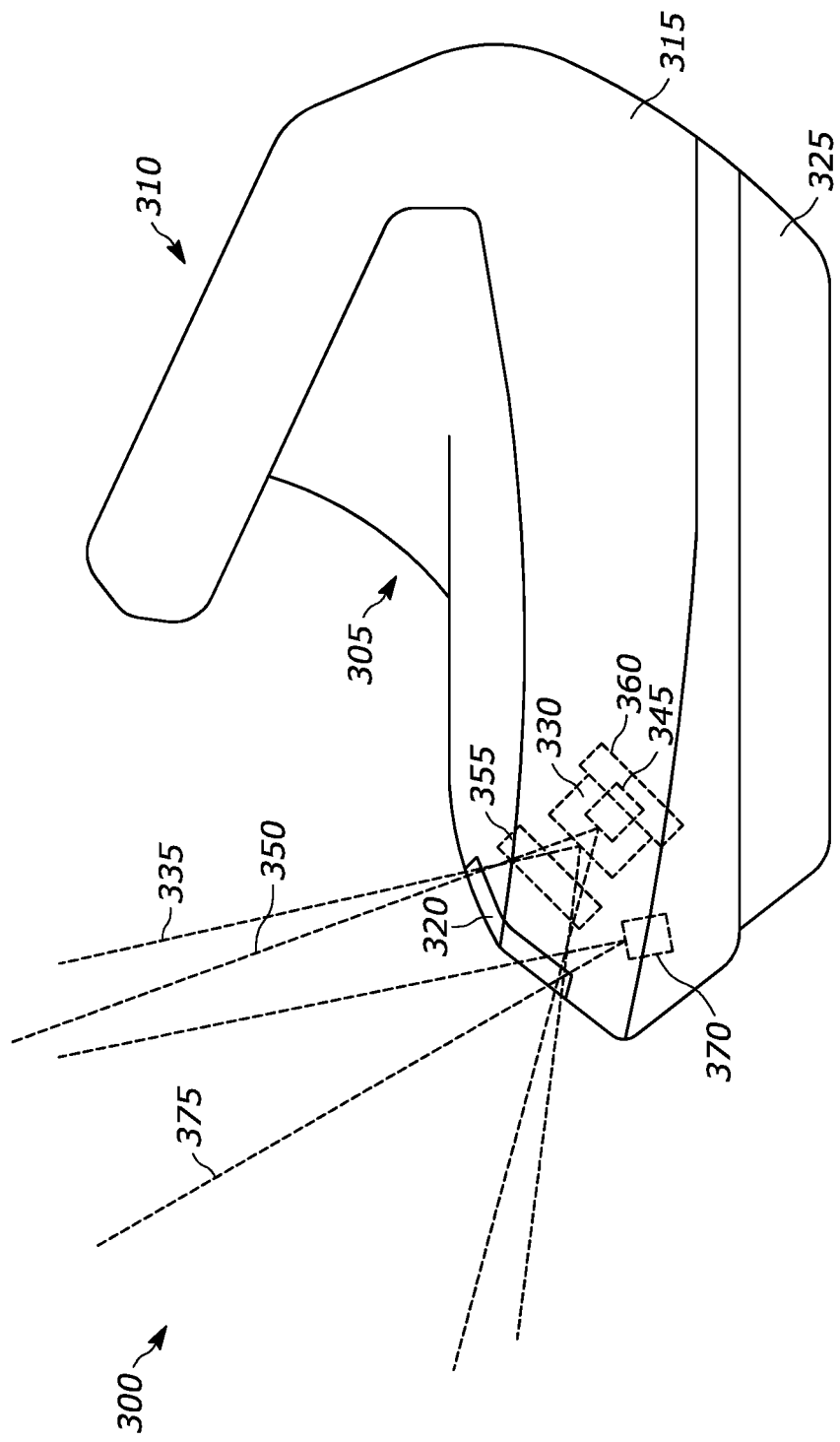
FIG. 3B illustrates a side view of the example barcode reader cradle of FIG. 3A.
Figure 3C:
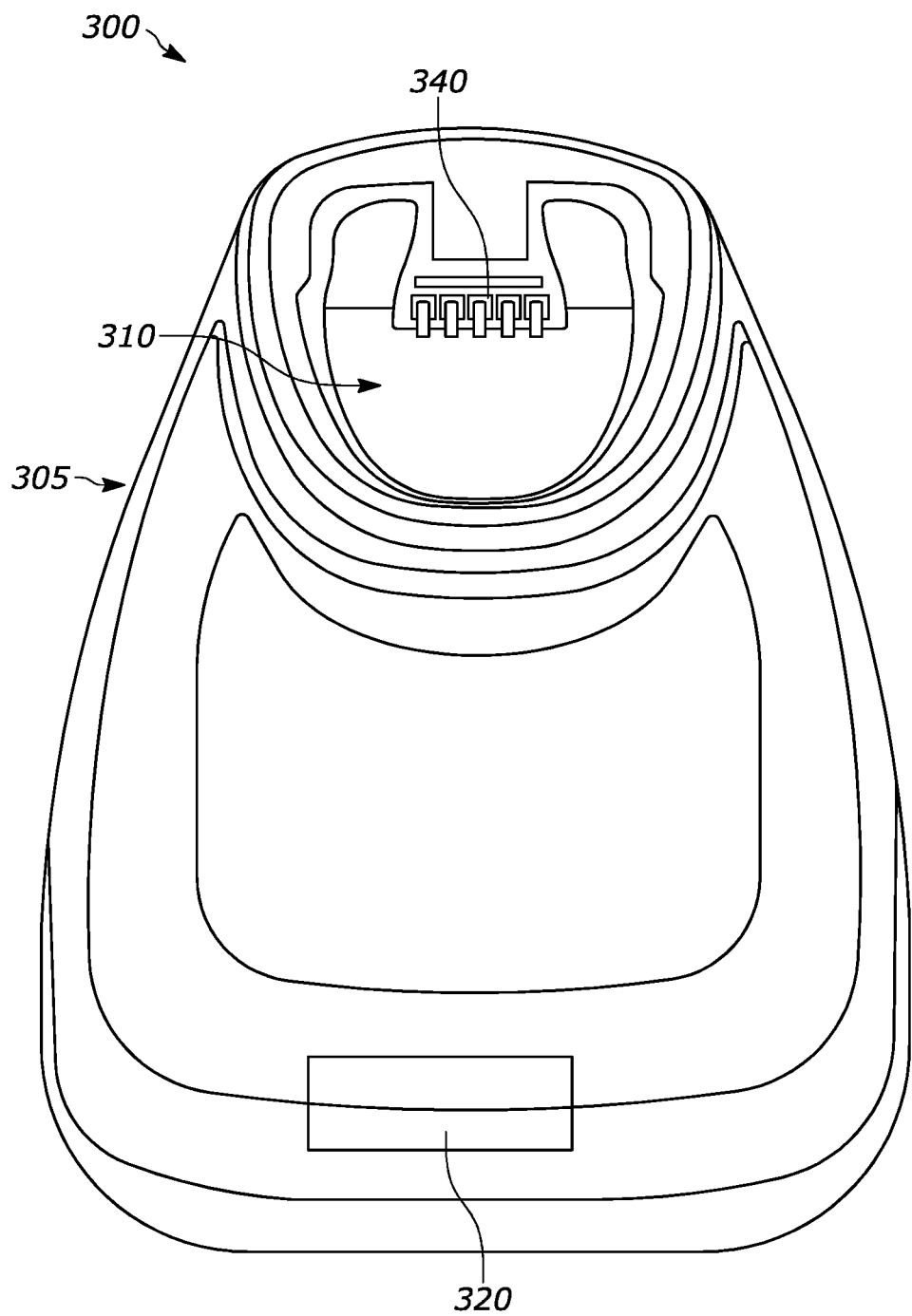
FIG. 3C illustrates a top view of the example barcode reader cradle of FIG. 3A.
Figure 3D:
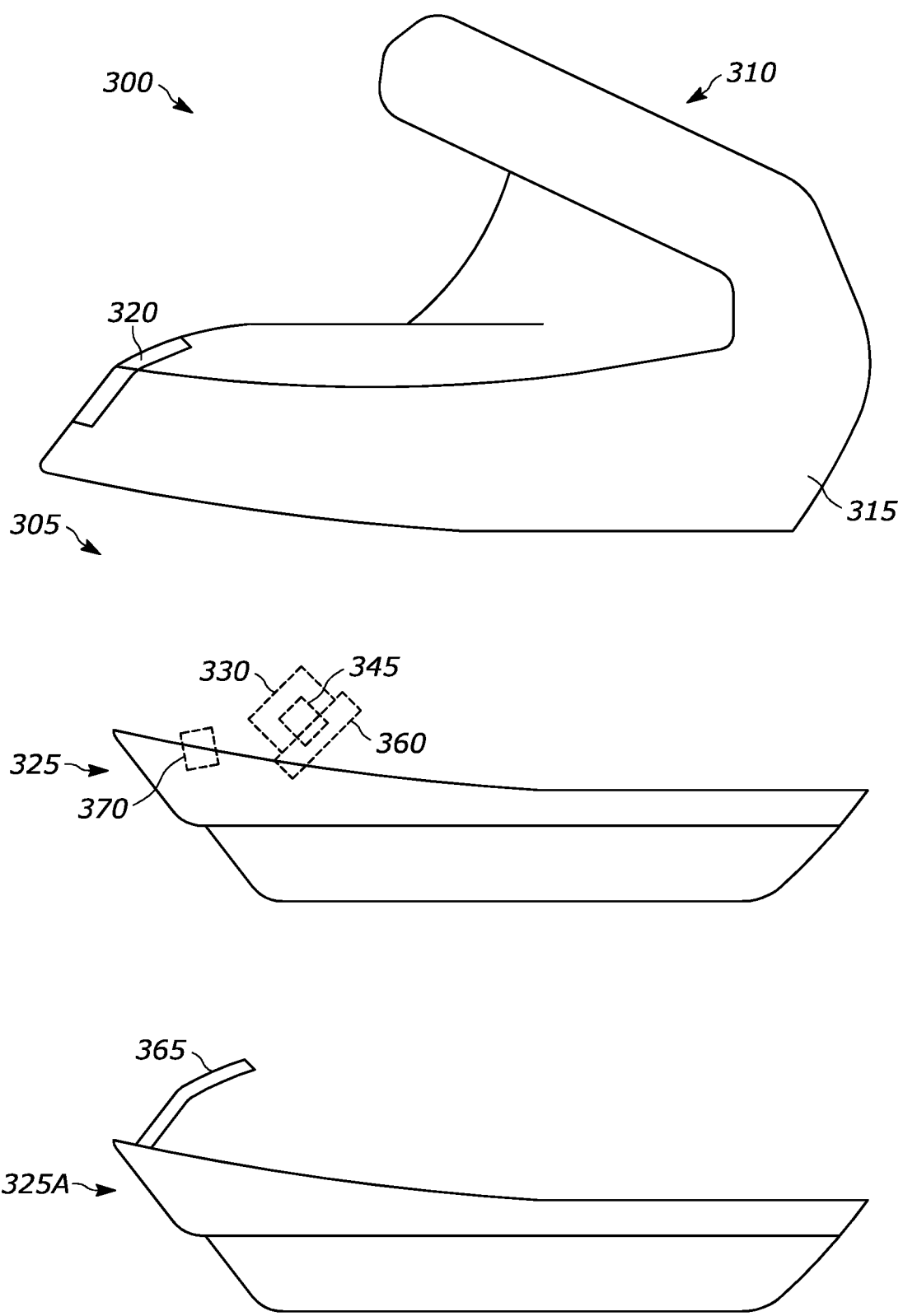
FIG. 3D illustrates a dissembled side view of the example barcode reader cradle of FIG. 3A.

Referring next to FIG. 2, a block diagram of an example architecture for an imaging device such as handheld barcode reader 100 is shown. For at least some of the reader embodiments, an imaging assembly 245 includes a light-detecting sensor or imager 241 operatively coupled to, or mounted on, a printed circuit board (PCB) 242 in the imaging device 200 as shown in FIG. 2. In an embodiment, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a field of view along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In some implementations, the imager 241 is or includes the barcode reading module 120 (e.g., a monochromatic imaging sensor) of FIGS. 1A-1C. In further implementations, the imager 241 additionally or alternatively is or includes the vision camera 155 (e.g., a color imaging sensor) of FIGS. 1A-1C. It will be understood that, although imager 241 is depicted in FIG. 2 as a single block, that imager 241 may be multiple sensors spread out in different locations of imaging device 200.

The return light is scattered and/or reflected from an object 118 over the field of view. The imaging lens 244 is operative for focusing the return light onto the array of image sensors to enable the object 118 to be imaged. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an embodiment, WD1 is about one-half inch from the window 208, and WD2 is about thirty inches from the window 208.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 118 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 118.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 118 in the direction of the FOV of the imager 241.

Further, the imager 241, the illumination source 251, and the aiming source 223 are operatively connected to a controller or programmed microprocessor 258 operative for controlling the operation of these components. Depending on the implementation, the microprocessor 258 is the controller 170 as described above with regard to FIGS. 1A-1C. In some implementations, the microprocessor 258 functions as or is communicatively coupled to a vision application processor for receiving, processing, and/or analyzing the image data captured by the imagers.

A memory 160 is connected and accessible to the controller 258. Preferably, the microprocessor 258 is the same as the one used for processing the captured return light from the illuminated object 118 to obtain data related to the object 118. Though not shown, additional optical elements, such as collimators, lenses, apertures, compartment walls, etc. may be provided in the housing. Although FIG. 2 shows the imager 241, the illumination source 251, and the aiming source 223 as being mounted on the same PCB 242, it should be understood that different embodiments of the imaging device 200 may have these components each on a separate PCB, or in different combinations on separate PCBs. For example, in an embodiment of the imaging device 200, the illumination LED source is provided as an off-axis illumination (i.e., has a central illumination axis that is not parallel to the central FOV axis).

In some implementations, the object 118 is or includes an indicia for decoding, such as a barcode, a QR code, a label, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200.

Referring to FIGS. 3A-4B, an example base 300 is illustrated that is configured to receive and support a handheld barcode reader. Base 300 can be a presentation cradle that supports and holds the handheld barcode reader (e.g., base 300 can hold the handheld barcode reader in an orientation that allows the handheld barcode reader to be used in a hands free application) and/or a charging base that supports, holds, and charges the handheld barcode reader. Base 300 generally includes a base housing 305 with a cradle section 310 that is configured to receive the handheld barcode reader. Base housing 305 can have an upper portion 315, which could include cradle section 310, and a lower portion 325 that is removably attached to upper portion 315. If base 300 is a charging base, base 300 can include one or more charging contacts 340 configured to contact corresponding charging contacts on the handheld barcode reader to charge the handheld barcode reader. Alternatively, rather than charging contacts 340, base 300 can include an induction charging coil or any other applicable charging means to charge the handheld barcode reader.

A vision camera 330 is positioned within base housing 305 and has a first FOV 335 that is directed through a base window 320 formed base housing 305, and specifically in upper portion 315 of base housing 305 in the example shown. In one example, vision camera 330 can be movable/rotatable within base housing 305 such that the direction that first FOV 335 is directed through base window 320 is adjustable horizontally and/or vertically. Movement/rotation of vision camera 330 can be accomplished by mounting vision camera 330 to a gimbal 360 or other device that would allow movement of vision camera 330 within base housing 305. In the example shown, vision camera 330 is configured to capture images to perform functions such as facial recognition, gesture recognition, product identification, scan avoidance, ticket switching, etc., and is not configured to capture images for decoding barcodes. Base 300 can also include an illumination source 345 positioned within base housing 305 that directs illumination 350 through base window 320 to illuminate objects within first FOV 335. A diffuser 355 can also be positioned in front of illumination source 345 to diffuse illumination 350.

Base 300 can also have two switchable, field upgradeable lower portions so that base 300 can be can be configured to have vision camera 330 or not have vision camera 330. For example, referring to FIG. 3C, base housing 305 of base 300 can have lower portion 325, as described above, which includes vision camera 330 (and illumination source 345 if used) and can have a switchable, field upgradeable second lower portion 325A that is also removably attachable to upper portion 315, for example via screes, snaps, pins, toggle switches, etc., and that does not include vision camera 330 or illumination source 345. Since second lower portion 325A does not have vision camera 330, second lower portion 325A could have an extension 365 that extends from second lower portion 325A and is configured to block base window 320 in upper portion 315. Alternatively, rather than extension 365, base window 320 could be covered or blocked by a label, a plug, a plate, etc. when second lower portion 325A is used.

Figure 4A:
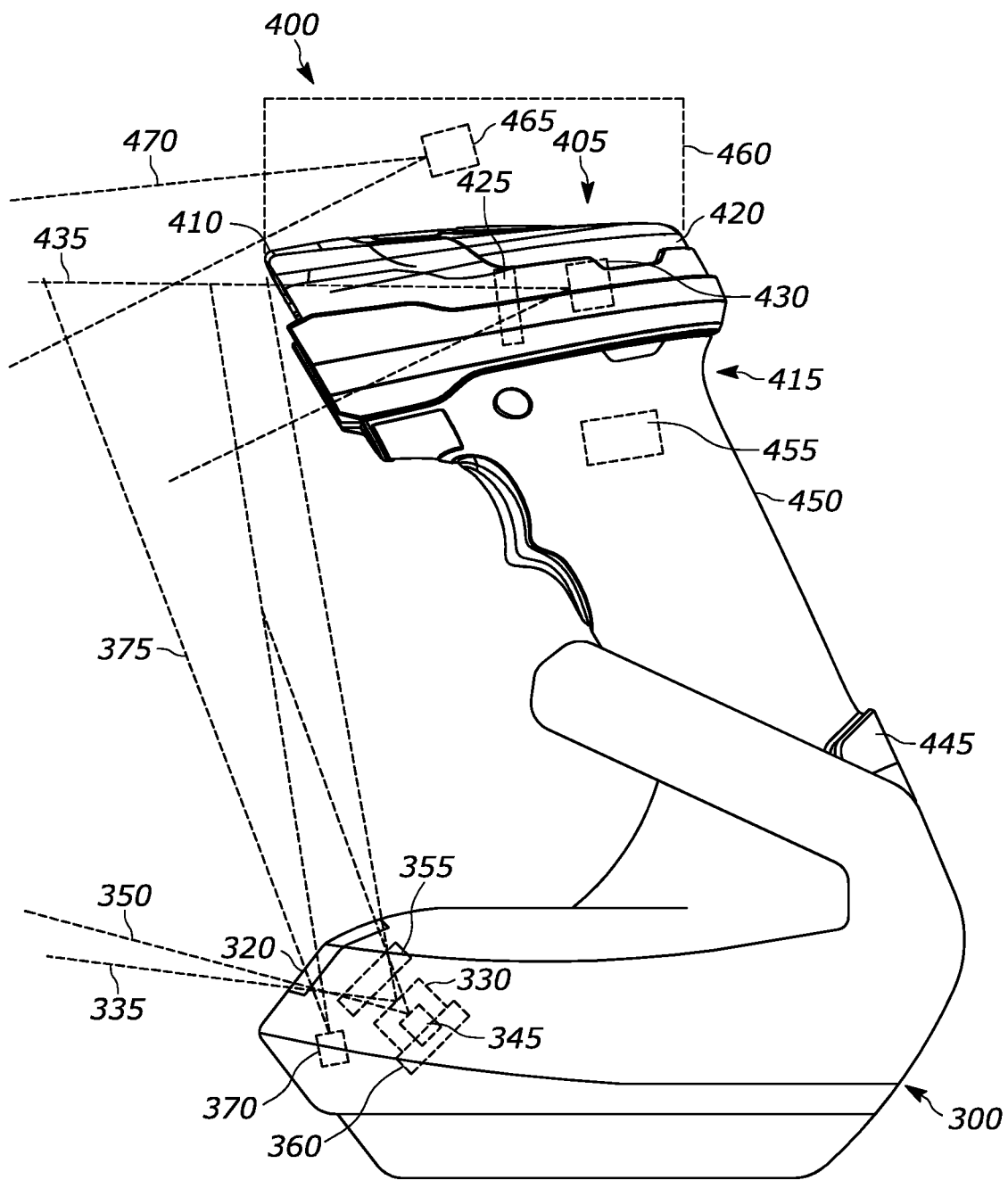
FIG. 4A illustrates a side view of a second example handheld barcode reader placed in the example barcode reader cradle of FIG. 3A and including an optional peripheral.

Referring to FIG. 4A, an example handheld barcode reader assembly 400 is illustrated that includes base 300, described above and illustrated in FIGS. 17-20, and a handheld barcode reader 405 positioned in base 300. Example handheld barcode reader 405 generally includes a housing 415 having a head portion 420, a base portion 445, and a handle portion 450 positioned between head portion 420 and base portion 445 and configured to be grasped by a user.

A barcode reading module 430 is positioned at least partially in head portion 420 and has a second FOV 435 that is directed through a scan window 425 in head portion 420 and can at least partially overlap first FOV 335 of vision camera 330 of base 300 when handheld barcode reader 405 is positioned in base 300.

In some implementations, reader 405 further includes a vision camera extension 460 including a machine vision camera 465 with FOV 470. In some implementations, the FOV 470 at least partially overlaps with FOV 435. In further implementations, the reader 405 includes the vision camera extension 460 in place of the base 300. In further implementations, the reader 405 includes the vision camera extension 460 in addition to the base 300, and the base 300 does not include vision camera 330.

Handheld barcode reader 405 also has a controller 455 within housing 305 that is in communication with barcode reading module 430 and with vision camera 330 of base 300, for example, through charging contacts 340 or through any other available contract, contactless, wired, or wireless means. Controller 455 is configured to decode process signals from barcode reading module 430 from barcodes that are read by barcode reading module 430 and to receive and process images captured by and received from vision camera 330 of base 300 or vision camera 465 of vision camera extension 465 for processes that do not include barcode reading, as discussed above. Controller 455 is also configured to synchronize barcode reading module 430 and vision camera 330 of base 300 or vision camera 465 of vision camera extension 465 when handheld barcode reader 405 is positioned in base 300 so that vision camera 330 or 465 does not capture images when barcode reading module 430 is active or so that vision camera 330 or 465 captures images in tandem with barcode reading module 430. Controller 455 can synchronize barcode reading module 430 and vision camera 330 or 465 based on images captured by vision camera 330 or base 300 could have an optical sensor 370 that is positioned in base 300, is in communication with controller 455, and has a third FOV 375 that at least partially overlaps second FOV 435 of barcode reading module 430 to determine when barcode reading module 430 is active. Controller 455 can then be configured to receive signals from optical sensor 370 indicating whether or not barcode reading module 430 is active and synchronize vision camera 330 or 465 and barcode reading module 430 based on the signals received from optical sensor 370

If base 300 is a charging base, handheld barcode reader 405 can have charging contacts, an induction coil, or another appropriate charging means that correspond to charging contacts 340, an induction coil, or another appropriate charging means in base 300 to charge handheld barcode reader 405 when it is positioned in base 300. In addition, as can be seen in FIG. 4A, with handheld barcode reader 405 positioned in base 300, a front edge 410 of handheld barcode reader 405 is visible within first FOV 335 of vision camera 330 of base 300, which can provide one way for handheld barcode reader assembly 400 to determine if/when handheld barcode reader 405 is present in base 300.

Figure 4B:
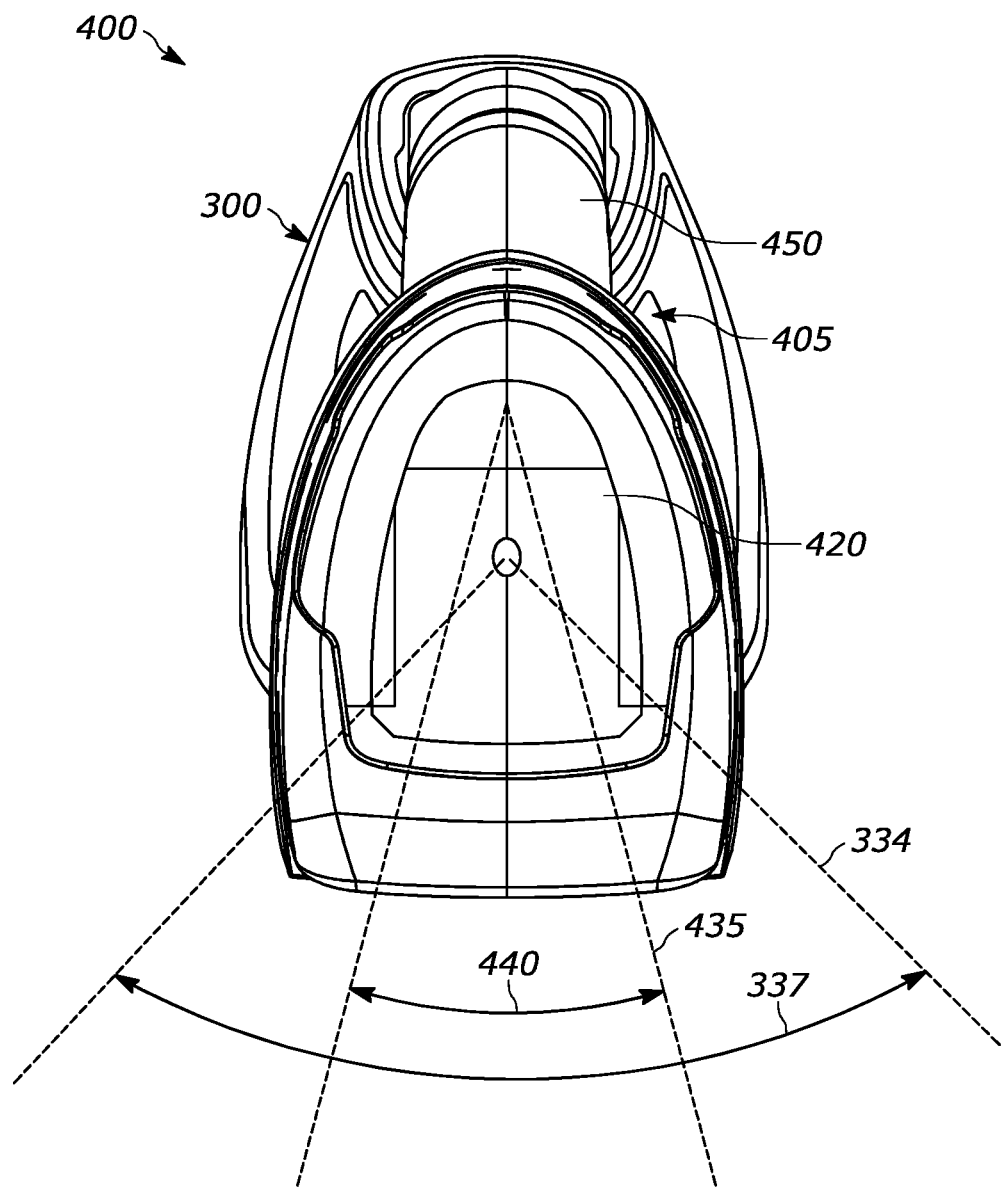
FIG. 4B illustrates a top view of the handheld barcode reader and cradle of FIG. 4A.

As best shown in FIG. 4B, first FOV 335 of vision camera 330 of base 300 has a horizontal viewing angle 337 that is larger than the horizontal viewing angle 440 of second FOV 435 of barcode reading module 430 of handheld barcode reader 405. For example, horizontal viewing angle 337 of first FOV 335 could be between 80 degrees and 120 degrees and is preferably 100 degrees. In addition, horizontal viewing angle 440 of second FOV 435 could be between 40 degrees and 60 degrees. With horizontal viewing angle 337 of first FOV 335 of vision camera 330 being wider than horizontal viewing angle 440 of second FOV 435 of barcode reading module 430, vision camera 330 can be used as a wake-up system and controller 455 can be configured to turn on barcode reading module 430 when an object is detected in first FOV 335 of vision camera 330 and handheld barcode reader 405 is positioned in base 300, before the object reaches second FOV 435 of barcode reading module 430. This allows barcode reading module 430 to be active as the object enters second FOV 435 and allows more time for barcode reading module 430 to read and decode a barcode on the object when handheld barcode reader 405 is positioned in base 300 and operating in a hands free mode of operation.

In addition, base 300 of handheld barcode reader assembly 400 can also have two switchable, field upgradeable lower portions so that base 300 can be can be configured to have vision camera 330 or not have vision camera 330, as described above.

Figure 5:
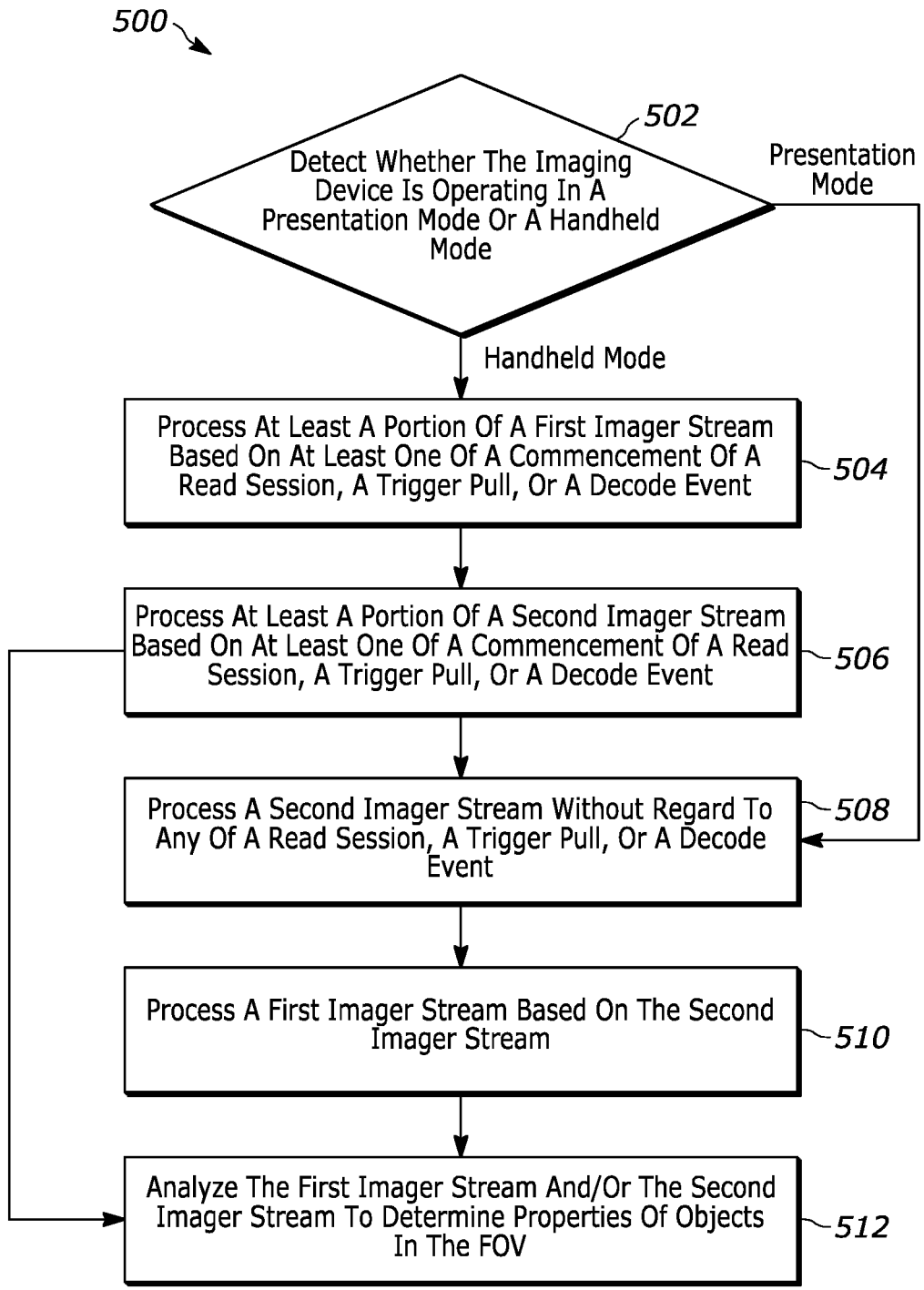
FIG. 5 illustrates a flow diagram of an example method for identifying an operation mode of an imaging device and processing imaging data based on the operation mode.

Referring next to FIG. 5 the method 500 illustrates a flow diagram of an example method for detecting an operation mode of an imaging device and modifying processing of imaging data based on the operation mode. Although the method 500 is described below with regard to imaging device 200 and components thereof as illustrated in FIG. 2, it will be understood that other similarly suitable imaging devices and components may be used instead. Similarly, although the method 500 is described below with regard to a vision application processor such as microprocessor 258 included in imaging device 200, it will be understood that the method 500 may be performed by a computing device including a vision application processor communicatively coupled with the imaging device 200 in addition or instead of the microprocessor 258.

In some implementations, the method 500 is performed by an imaging device 200 that includes a first imaging sensor, such as a monochrome imaging sensor, and a second imaging sensor, such as a color imaging sensor and/or vision camera, separate from each other. In some such implementations, the first imaging sensor is operable to receive light from a first FOV and the second imaging sensor is operable to receive light from a second, different FOV. In further implementations, the first imaging sensor is configured to capture a first imager stream of image data and the second imager is configured to capture a second imager stream of image data. In some implementations, the second imager stream lasts longer and/or has a higher framerate than the first imager stream. For example, the second imager stream may include a stream of images and/or video footage such that the second imager stream starts before the first imager stream and ends after the first imager stream. Similarly, the first imager stream may include series of discontinuous (e.g., discrete) images and/or may be dependent on the second imager stream or a trigger event, as described in more detail below.

Depending on the implementation, the imaging device may operate in a number of operation modes. For example, a first operation mode may be a presentation mode and a second operation mode may include a handheld mode, as described herein. As further examples, the imaging device may operate in any operation mode that makes use of the second imaging sensor, such as a theft prevention operation mode, a facial recognition operation mode, a signal identification operation mode, an idle operation mode, etc. Similarly, the operation mode may be any operation mode that uses the first imaging sensor, such as an out-of-range operation mode, an RFID tag operation mode, etc. Depending on the implementation, some operation modes listed above may utilize both imaging sensors.

At block 502, the microprocessor 258 detects whether the imaging device is operating in the presentation mode or the handheld mode as described above. In some implementations, the microprocessor 258 detects whether the imaging device 200 is operating in the presentation mode or the handheld mode based on whether a microprocessor presently connects to the second imaging sensor. For example, in implementations in which the imaging device includes a removable cradle that holds the second imaging sensor, the microprocessor 258 may detect that the imaging device 200 is operating in the first operation mode when the imaging device 200 detects that the imaging device 200 is in the cradle. As such, in various implementations, the microprocessor 258 detects whether the imaging device 200 is operating in the first operation mode or the second operation mode by: (i) using a magnetic sensor to detect if the scanner is in a cradle via the hall effect or a reed switch, (ii) using feedback from a charging system to detect if the scanner is in or out of the cradle (or charger), (iii) using a capacitive touch sensor to detect if a user is holding the unit for handheld operation, (iv) using a wireless signal strength or presence to detect if the scanner is a certain distance from the base, (v) comparing the image of the scene with a previous image to detect if the scanner is in an expected position for presentation mode, (vi) the imaging sensor recognizing the presence of a feature on the cradle or a target mark in the environment, (vii) using the trigger to see if the user is using the scanner in a handheld mode, (viii) using an accelerometer to determine whether the imaging device is in a cradle, (ix) some combination thereof, or (x) any other similar technique.

If the microprocessor 258 determines that the imaging device 200 is operating in the handheld mode, then flow continues to blocks 504 and 506. If the microprocessor 258 instead determines that the imaging device 200 is operating in the presentation mode, then flow continues instead to blocks 508 and 510. After the respective blocks 504/506 or 508/510, flow then continues to block 512.

At block 504, the microprocessor 258, responsive to detecting that the imaging device 200 is operating in the handheld mode, processes at least a portion of the first imager stream based on at least one of a commencement of a read session, a trigger event, or a decode event. Similarly, at block 506, the microprocessor 258, responsive to detecting that the imaging device 200 is operating in the handheld mode, processes at least a portion of the second imager stream based on an activation event, such as at least one of the commencement of the read session, the trigger event, or the decode event. Depending on the implementation, a trigger event may refer to a physical trigger pull by a user, a button actuation by a user, a pressure system interaction by a user, a cap touch system interaction by a user, etc.

In some implementations, the microprocessor 258 causes the first and/or second imaging sensor to activate and/or begin capturing the respective imager streams responsive to the activation event. In further implementations, the microprocessor 258 may process all frames received by the microprocessor during a duration dependent on the activation event. For example, in implementations in which the duration is dependent on a trigger event, the microprocessor 258 may process all frames received from the trigger event until a predetermined period of time passes, a predetermined event occurs, a user releases the trigger, etc. In further such implementations, the microprocessor 258 may process frames received a predetermined period of time prior to the trigger event as well (e.g., 1 second, 2 seconds, 5 seconds, etc.). Similarly, depending on the implementation, the microprocessor 258 processes one or more frames that coincide with the activation period. For example, the microprocessor 258 may process frames that coincide with: (a) the read session, (b) the decode event, (c) a wakeup event (such as an IR wakeup system, scene detect, or a differential brightness object detection system event), (d) a first predetermined timeframe beginning with the trigger event, or (e) a second predetermined timeframe beginning prior to the trigger event and including the trigger event.

In some implementations, the portion of the first imager stream and the portion of the second imager stream are reduced portions of the FOV for the respective imager stream. In further implementations, the portion of the first imager stream and/or the portion of the second imager stream are a particularly relevant portion of the imager stream (e.g., the barcode, the object, a shopper cart, etc.). In some such implementations, the microprocessor 258 crops the first imager stream and/or the second imager stream to generate the portion of the first imager stream and/or the portion of the second imager stream. Depending on the implementation, the microprocessor may use optical character recognition, machine learning, image recognition, or other optical processing techniques to determine what portions of the imager stream(s) should be cropped.

At block 508, the microprocessor 258, responsive to detecting that the imaging device 200 is operating in the presentation mode, processes the second imager stream without regard to an activation event, such as any of the commencement of the read session, the trigger event, or the decode event. Similarly, at block 510, the microprocessor 258, responsive to detecting that the imaging device 200 is operating in the presentation mode, processes the first imager stream based on the second imager stream. In some implementations, the second imaging sensor is constantly capturing and/or transmitting the second imager stream to the microprocessor 258 so long as the imaging device 200 is operating in the presentation mode. In some such implementations, the first imaging sensor remains dormant or off until the microprocessor 258 detects an object such as object 118 in the FOV of the second imager stream. In further implementations, the microprocessor 258 detects scene change, brightness change, infrared detection change, etc. and subsequently causes the first imaging sensor to begin capturing and/or transmitting the first imager stream. Depending on the implementation, the microprocessor 258 may transmit an indication to the first imaging sensor to begin capturing the first imager stream upon identifying the object in the FOV. In further implementations, the microprocessor 258 transmits an indication to the first imaging sensor after detecting a barcode.

The microprocessor 258 then processes the first imager stream based on the second imager stream. In some implementations, the microprocessor causes the first imaging sensor to activate in response to detecting the object 118. The microprocessor 258 then receives the first imager stream from the first imaging sensor. In some implementations, the microprocessor 258 identifies a barcode and decodes the barcode. In further implementations, the microprocessor 258 causes the first imaging sensor to at least temporarily stop operations after decoding the barcode until another object enters the FOV for the second imager stream. In still further implementations, the microprocessor 258 causes the first imaging sensor to at least temporarily stop capturing the first imager stream in response to detecting that the object 118 leaves the FOV for the second imager stream instead.

In some implementations, the microprocessor 258 processes the first imager stream and/or the second imager stream by receiving a first set of frames representative of the first imager stream and/or a second set of frames representative of the second imager stream. In such implementations, a controller of the imaging device 200 tags or otherwise selects relevant images for the respective imager stream before transmitting them to the microprocessor 258. In other implementations, the microprocessor 258 generates such a first set of frames and second set of frames based on the respective imager stream. In such implementations, the imaging device 200 transmits the first imager stream and/or the second imager stream without regard to the relevance of the particular frame, instead transmitting the streams indiscriminately. Similarly, the microprocessor 258 may similarly process the portion of the first imager stream and/or the portion of the second imager stream in the handheld mode.

At block 512, the microprocessor 258 analyzes the first imager stream and/or the second imager stream to determine a properties of an object visible in the first FOV and/or the second FOV. Depending on the implementation, the properties for the object may include: (i) whether the object matches a reference associated with a barcode on the object (e.g., a ticket switch event), (ii) whether the imaging data includes sufficient information to identify the object, (iii) whether the object is moving through the second FOV without a scan event occurring, (iv) whether the object includes identifying information (e.g., facial features, a license plate, a car make/model, an address, etc.), (v) a quantity of objects matching the object present in a current inventory, (vi) size of the object, (vii) whether the object reaches a threshold distance from the imaging device 200 without a trigger event (such as a trigger pull, a decode of a barcode, etc.), (viii) the presence or lack thereof of a barcode, QR code, etc. and/or (ix) any other similar set of properties as described herein.

For example, while an imaging device 200 operating in a presentation operation mode may be used by a user to perform functions such as ticket switching detection, scan avoidance detection, produce recognition, etc., each of which benefits from a constant stream of imager data from the video camera while only occasionally requiring the monochrome sensor to capture and transmit image data. For example, in some implementations, the microprocessor 258 analyzes the first imager stream to decode a barcode associated with an object 118 in the FOV. The microprocessor 258 then references the decoded barcode with the object 118 by comparing the second imager stream with a reference associated with the barcode. If the object and the barcode do not match, the microprocessor 258 may determine that a ticket switching event has occurred and may take action to alert the user, an employee, etc. Similarly, in another implementation, the microprocessor 258 may determine that no barcode is present in the first imager stream even after the object 118 enters the FOV for the first imaging sensor or leaves the FOV for the second imaging sensor. In some such implementations, the microprocessor 258 may determine that the object 118 is a form of produce or other item without a barcode, and performs a lookup to determine a code associated with the produce. In other implementations, the microprocessor determines that the user is intentionally obfuscating the barcode (e.g., by covering the barcode with a hand or turning it away) to perform a scan avoidance and/or sweethearting action and may similarly alert a user or store employee.

Similarly, as another example, the microprocessor 258 receives an indication of an activation event, such as a trigger pull by a user, while the imaging device 200 is operating in a handheld mode. The microprocessor 258 then receives one or more frames from the first imaging sensor to attempt to decode a barcode associated with an object such as object 118. The microprocessor 258 may determine that the first imager stream does not include sufficient information for the microprocessor 258 to decode the barcode, such as the barcode being too close to the scanner when the trigger is pulled. The microprocessor 258 may then reference one or more frames from the first imager stream or the second imager stream recorded and stored in memory prior to the trigger event to determine whether any of the stored frames contain sufficient information to complete the decode. If not, the microprocessor may cause an alert to be conveyed to the user (e.g., a beep, a displayed message, a pre-recorded message, etc.) telling the user to try scanning again. Similarly, the microprocessor may continue scanning and waiting for the barcode to be captured properly or until a predetermined timeframe expires. If the microprocessor can complete the decode event, the microprocessor may do so and end the scanning duration.

In further implementations, the imaging device 200 additionally or alternatively captures further image data in a third operation mode from at least one of the first imaging sensor, the second imaging sensor, or an additional imaging sensor (s) included in the imaging device 200. Depending on the implementation, the imaging sensor may be or include a monochromatic imaging sensor, a color imaging sensor, etc. The imaging device 200 may then process and analyze the first imager stream, second imager stream, or additional imager stream as described in more detail below with regard to FIG. 6. The third operation mode may be or include a theft prevention operation mode, a facial recognition operation mode, a signal identification operation mode, an idle operation mode, an out-of-range operation mode, an RFID tag operation mode, etc. Similarly, depending on the implementation, analyzed properties may include any of (i) whether the object matches a reference associated with a barcode on the object (e.g., a ticket switch event), (ii) whether the imaging data includes sufficient information to identify the object, (iii) whether the object is moving through the second FOV without a scan event occurring, (iv) whether the object includes identifying information (e.g., facial features, a license plate, a car make/model, an address, etc.), (v) a quantity of objects matching the object present in a current inventory, (vi) size of the object, (vii) whether the object reaches a threshold distance from the imaging device 200 without a trigger event (such as a trigger pull, a decode of a barcode, etc.), (viii) the presence or lack thereof of a barcode, QR code, etc., and/or (ix) any other similar set of properties as described herein.

Figure 6:
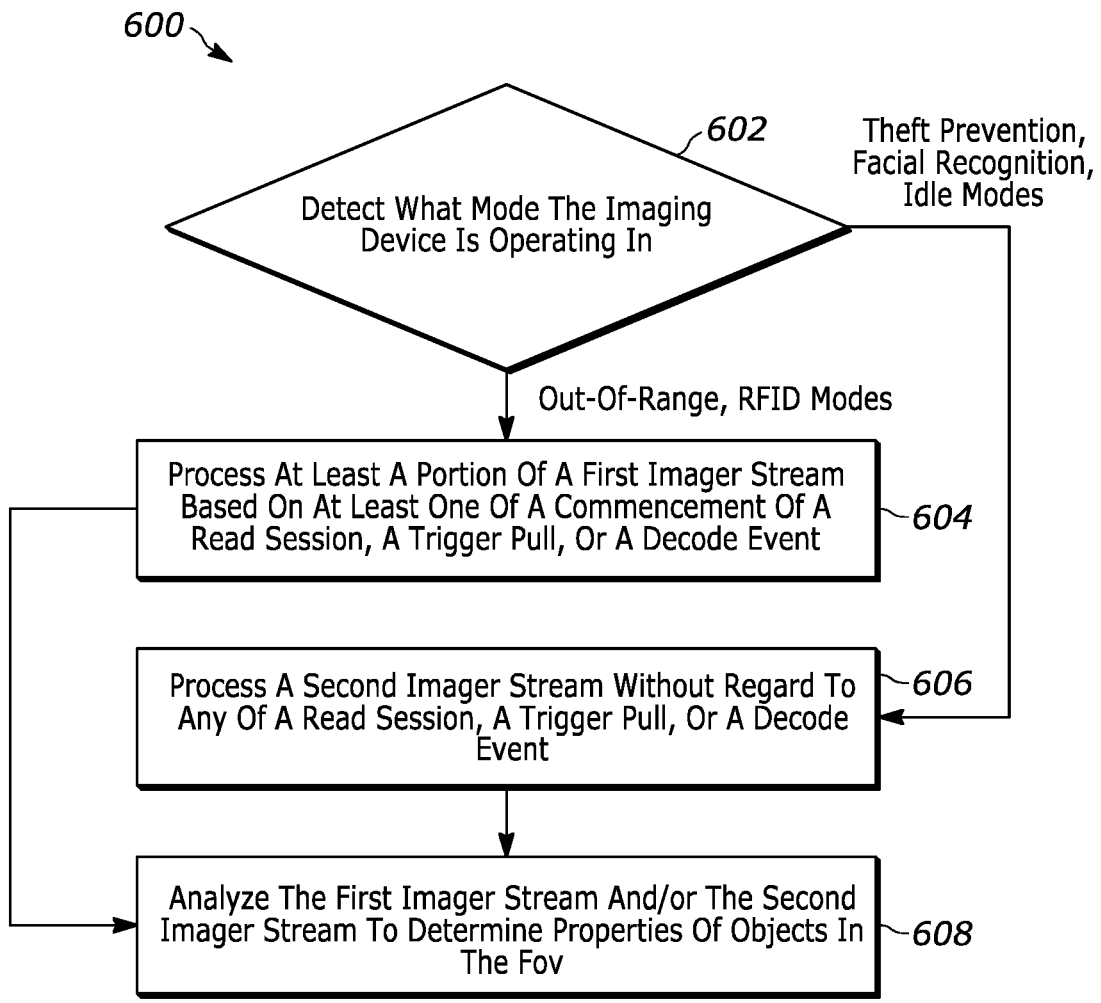
FIG. 6 illustrates a flow diagram of an example method for identifying an operation mode of an imaging device and processing imaging data based on the operation mode.

Referring next to FIG. 6, the method 600 illustrates a flow diagram of an example method for detecting an operation mode of an imaging device and modifying processing of imaging data based on the operation mode. Although the method 600 is described below with regard to imaging device 200 and components thereof as illustrated in FIG. 2, it will be understood that other similarly suitable imaging devices and components may be used instead. Similarly, although the method 500 is described below with regard to a vision application processor such as microprocessor 258 included in imaging device 200, it will be understood that the method 500 may be performed by a computing device including a vision application processor communicatively coupled with the imaging device 200 in addition or instead of the microprocessor 258.

In some implementations, the method 600 is performed by an imaging device 200 that includes a single imaging sensor, such as a sensor for a video camera, or multiple imaging sensors, such as a monochromatic imaging sensor and a color imaging sensor or video camera, as described above with regard to FIG. 5. Depending on the implementation, the imaging device may operate in a presentation mode, a handheld mode, a theft prevention operation mode, a facial recognition operation mode, a signal identification operation mode, an idle operation mode, an out-of-range operation mode, an RFID tag operation mode, etc.

At block 602, the microprocessor 258 detects in which mode the imaging assembly is operating. In some implementations, the imaging device 200 operates in the presentation mode or the handheld mode, and the various other modes as described above are subsets of at least one of the handheld mode or the presentation mode. In some such implementations, the microprocessor 258 automatically determines whether the imaging device 200 is operating in the presentation or handheld mode, but requires input from a user to determine whether the imaging device 200 is operating in a subset mode, such as a button press, parameter barcode scan, etc. In other implementations, the additional modes are alternatives to the presentation or handheld mode. In such implementations, the microprocessor 258 may determine which mode the imaging device 200 is operating in as described herein.

In some implementations, if the microprocessor 258 determines that the imaging device 200 is operating in a mode that prioritizes the first imager stream and/or decoding a barcode or other identifier, such as the out-of-range mode, RFID tag mode, etc., then flow continues to block 604. If the microprocessor 258 instead determines that the imaging device 200 is operating in a mode that prioritizes the second imager stream and/or gathering large quantities of image data, such as the theft prevention mode, facial recognition mode, idle mode, etc., then flow continues instead to block 606. After the respective block 604 or 606, flow then continues to block 608.

At block 604, the microprocessor 258 processes at least a portion of a first imager stream based on at least one of a commencement of a read session, a trigger event, or a decode event, similar to block 504 of FIG. 5 as described above. In some implementations, the microprocessor 258 does not require image data from the second imaging sensor and causes the second imaging sensor to temporarily deactivate and/or remain temporarily deactivated. In further implementations, the microprocessor 258 receives and processes at least a portion of the second imager stream as described above with regard to FIG. 5.

At block 606, the microprocessor 258 processes a second imager stream without regard to any of the read session, trigger event, decode event, etc., similar to block 508 of FIG. 5 as described above. Depending on the implementation, the microprocessor may not require image data from the first imaging sensor, and may cause the first imaging sensor to temporarily deactivate and/or remain temporarily deactivated. In further implementations, the microprocessor 258 receives and processes the first imager stream as described above with regard to FIG. 5.

At block 608, the microprocessor 258 analyzes the first imager stream and/or the second imager stream to determine properties of objects in the FOV. For example, when the imaging device 200 operates in the out-of-range mode, the microprocessor 258 may determine that a user is using the imaging device 200 for inventory management. As such, the microprocessor 258 may analyze the first imager stream for barcode data, and communicate with a server to determine a stock present for a particular item associated with the barcode data. Similarly, when the imaging device 200 operates in an RFID tag mode, the microprocessor 258 may detect an RFID tag and begin an RFID communication and/or transmission process.

Similarly, when the imaging device 200 operates in a theft prevention mode, the imaging device 200 may begin transmitting the second imaging stream at a greater framerate, higher power, etc. As such, the imaging device 200 may deactivate the first imaging sensor to save and/or redirect power and/or bandwidth. Moreover, the microprocessor 258 may begin analyzing the second imager stream for any indications of identifying information, such as a face, license plate, make/model of vehicle, etc. to transmit. In some implementations, the microprocessor 258 may similarly analyze the second imager stream for facial characteristics when the imaging device is in a facial recognition mode. In further implementations, the imaging device 200 may perform similar functionality to the theft prevention mode when the imaging device 200 is operating in an idle or out-of-range mode to detect when a customer accidentally or purposely leaves the store with the imaging device 200. Depending on the implementation, the microprocessor 258 may determine that that the imaging device 200 is in motion (e.g., via an accelerometer, GPS location tracking, etc.) prior to causing the second imager to increase the framerate, power, etc. In further implementations, the microprocessor may determine that the imaging device 200 is in motion prior to entering the theft prevention mode.

As another example, when the imaging device 200 operates in an idle mode, the second imaging sensor may transmit the second imager stream to the microprocessor 258 and the microprocessor 258 may analyze the second imager stream to determine whether any movement takes place within the FOV for the second imaging sensor. In further implementations, when the imaging device 200 operates in an idle mode, the first imaging sensor or the second imaging sensor may capture an image routinely after a predetermined duration (e.g., every second, every 2 seconds, every 5 seconds, etc.). In each such implementation, the microprocessor 258 may determine that a theft is occurring when any movement occurs without idle mode being deactivated. In other implementations, the microprocessor 258 may determine that a theft is occurring when the microprocessor 258 determines that a cart or object with a barcode is present in the FOV.

Depending on the implementation, the microprocessor 258 may deactivate or activate the first imaging sensor and/or second imaging sensor as necessary for the respective mode. As such, the imaging device 200 may utilize more resources when necessary while maintaining reduced power consumption, resource use, bandwidth, etc. when possible.

Although the various operation modes are referred to herein using consistent names to differentiate between modes (e.g., "handheld mode," "presentation mode," "idle mode," etc.), it will be understood that such names are for ease of description only. As such, depending on the implementation, modes with similar functionalities or similar methods for processing may include features of other modes as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for identifying an operation mode of an imaging device and processing imaging data based on the operation mode, the system comprising:
 an imaging device configured to operate in at least a handheld mode and a presentation mode, the imaging device including:
  a housing; and
  an imaging assembly at least partially disposed within the housing, the imaging assembly including:
   a first imager operable to receive light from a first field of view (FOV) and configured to capture a first imager stream, and
   a second imager operable to receive light from a second FOV and configured to capture a second imager stream; and
 a vision application processor and computer-readable media storing machine readable instructions that, when executed, cause the vision application processor to:
  (i) when the imaging device operates in the handheld mode:
   process at least a portion of the first imager stream and at least a portion of the second imager stream based on at least one of a commencement of a read session, a trigger event, or a decode event; and
  (ii) when the imaging device operates in the presentation mode:
   process the second imager stream without regard to any of the read session, the trigger event, or the decode event, and
   process the first imager stream based on the second imager stream.

2. The system of claim 1, wherein:
 processing at least the portion of the first imager stream and at least the portion of the second imager stream includes:
  causing the first imager and the second imager to activate based on the at least one of the commencement of the read session, the trigger event, or the decode event;
 processing the second imager stream includes:
  causing the second imager to activate without regard to any of the read session, the trigger event, or the decode event; and
 processing the first imager stream includes:
  causing the first imager to activate based on the second imager stream.

3. The system of claim 1, wherein:
 processing at least the portion of the first imager stream and at least the portion of the second imager stream includes at least one of:
  receiving a first set of frames representative of at least the portion of the first imager stream from the first imager and a second set of frames representative of at least the portion of the second imager stream from the second imager, or
  generating the first set of frames based on at least the portion of the first imager stream and the second set of frames based on at least the portion of the second imager stream;
 processing the second imager stream includes at least one of:
  receiving the second set of frames representative of the second imager stream from the second imager, or
  generating the second set of frames based on the second imager stream; and
 processing the first imager stream includes at least one of:
  receiving the first set of frames representative of the first imager stream from the first imager, or
  generating the first set of frames based on the first imager stream.

4. The system of claim 1, wherein the processing at least the portion of the first imager stream and at least the portion of the second imager stream includes processing all frames received by the vision application processor during a duration dependent on the at least one of the commencement of the read session, the trigger event, or the decode event.

5. The system of claim 1, wherein processing at least the portion of the first imager stream and at least the portion of the second imager stream includes:
 receiving, from the second imager, the second imager stream; and
 cropping the second imager stream to generate at least the portion of the second imager stream.

6. The system of claim 1, wherein processing at least a portion of the first imager stream and at least a portion of the second imager stream based on at least one of a commencement of a read session, a trigger event, or a decode event includes:
 processing one or more frames that coincide with at least one of: (a) the read session, (b) the decode event, (c) a wakeup event, (d) a first predetermined timeframe beginning with the trigger event, or (e) a second predetermined timeframe beginning prior to the trigger event and including the trigger event.

7. The system of claim 1, wherein processing at least a portion of the first imager stream and at least a portion of the second imager stream based on at least one of a commencement of a read session, a trigger event, or a decode event includes:
 receiving an indication of the at least one of the commencement of the read session, the trigger event, or the decode event;

responsive to receiving the indication, analyzing the first imager stream to determine whether the first imager stream includes sufficient information to identify an object in the first FOV; and responsive to determining that the first imager stream does not include sufficient information to identify the object, analyzing one or more frames of the second predetermined timeframe, the one or more frames captured prior to the trigger event.

8. The system of claim 1, wherein the imaging device further operates in at least one of a theft prevention mode, a facial recognition mode, a signal identification mode, or an idle mode, and wherein the machine readable instructions include instructions that, when executed, cause the vision application processor to further:
(iii) when the imaging device operates in at least one of the theft prevention mode, the facial recognition mode, the signal identification mode, or the idle mode:
process the second imager stream without regard to any of the read session, the trigger event, or the decode event.

9. The system of claim 8, wherein the imaging device operates in the idle mode and the machine readable instructions include instructions that, when executed, cause the vision application processor to further:
determine whether an object passes through the second FOV without a scan event occurring.

10. The system of claim 8, wherein the imaging device operates in the theft prevention mode, and the machine readable instructions include instructions that, when executed, cause the vision application processor to further:
determine, based on the second imager stream, that the imaging device is in motion; and
responsive to the determining that the imaging device is in motion, cause the imaging device to increase at least one of: (a) a framerate for the second imager stream or (b) a wireless signal range for the imaging device.

11. The system of claim 1, wherein:
processing the second imager stream includes:
identifying a barcode associated with an object visible in the second FOV; and
processing the first imager stream based on the second imager stream includes:
responsive to the identifying, causing the first imager to begin capturing the first imager stream.

12. The system of claim 11, wherein processing the first imager stream based on the second imager stream further includes:
receiving one or more frames of the first imager stream, wherein the one or more frames include the barcode of the object in the first FOV;
decoding the barcode; and
determining whether the object visible in the second FOV matches a reference associated with the barcode.

13. The system of claim 1, wherein the imaging device further operates in at least one of an out-of-range mode or an RFID tag mode, and wherein the machine readable instructions include instructions that, when executed, cause the vision application processor to further:
(iii) when the imaging device operates in at least one of the out-of-range mode or the RFID tag mode:
process at least the portion of the first imager stream based on the at least one of the commencement of the read session, the trigger event, or the decode event.

14. The system of claim 13, wherein the imaging device operates in the out-of-range mode and the machine readable instructions include instructions that, when executed, cause the vision application processor to further:
refrain from processing frames from the second imager stream.

15. The system of claim 14, wherein refraining from processing frames includes:
causing the second imager to refrain from capturing the second imager stream while the imaging device is operating in the out-of-range mode.

16. An imaging device configured to operate in at least a handheld mode and a presentation mode and capable of processing imaging data based on an operation mode of the imaging device, the imaging device comprising:
a housing;
an imaging assembly at least partially disposed within the housing, the imaging assembly including:
a first imager operable to receive light from a first field of view (FOV) and configured to capture a first imager stream, and
a second imager operable to receive light from a second FOV and configured to capture a second imager stream; and
a vision application processor and computer-readable media storing machine readable instructions that, when executed, cause the vision application processor to:
(i) when the imaging device operates in the handheld mode:
process at least a portion of the first imager stream and at least a portion of the second imager stream based on at least one of a commencement of a read session, a trigger event, or a decode event; and
(ii) when the imaging device operates in the presentation mode:
process the second imager stream without regard to any of the read session, the trigger event, or the decode event, and
process the first imager stream based on the second imager stream.

17. The imaging device of claim 16, wherein:
processing at least the portion of the first imager stream and at least the portion of the second imager stream includes:
causing the first imager and the second imager to activate based on the at least one of the commencement of the read session, the trigger event, or the decode event;
processing the second imager stream includes:
causing the second imager to activate without regard to any of the read session, the trigger event, or the decode event; and
processing the first imager stream includes:
causing the first imager to activate based on the second imager stream.

18. The imaging device of claim 16, wherein:
processing at least the portion of the first imager stream and at least the portion of the second imager stream includes at least one of:
transmitting the portion of the first imager stream from the first imager and the portion of the second imager stream from the second imager to a computing device, or
generating a first set of frames based on at least the portion of the first imager stream and a second set of frames based on at least the portion of the second imager stream;
processing the second imager stream includes at least one of:

transmitting the second imager stream from the second imager to the computing device, or generating the second set of frames based on the second imager stream; and processing the first imager stream includes at least one of:

transmitting the first imager stream from the first imager to the computing device, or generating the first set of frames based on the first imager stream.

19. The imaging device of claim 16, wherein the processing at least the portion of the first imager stream and at least the portion of the second imager stream includes processing all frames received by the vision application processor during a duration dependent on the at least one of the commencement of the read session, the trigger event, or the decode event.

20. The imaging device of claim 16, wherein processing at least the portion of the first imager stream and at least the portion of the second imager stream includes:

receiving, from the second imager, the second imager stream; and cropping the second imager stream to generate at least the portion of the second imager stream.

21. The imaging device of claim 16, wherein processing at least a portion of the first imager stream and at least a portion of the second imager stream based on at least one of a commencement of a read session, a trigger event, or a decode event includes:

processing one or more frames that coincide with at least one of: (a) the read session, (b) the decode event, (c) a wakeup event, (d) a first predetermined timeframe beginning with the trigger event, or (e) a second predetermined timeframe beginning prior to the trigger event and including the trigger event.

22. The imaging device of claim 16, wherein processing at least a portion of the first imager stream and at least a portion of the second imager stream based on at least one of a commencement of a read session, a trigger event, or a decode event includes:

receiving an indication of the at least one of the commencement of the read session, the trigger event, or the decode event;

responsive to receiving the indication, analyzing the first imager stream to determine whether the first imager stream includes sufficient information to identify an object in the first FOV; and responsive to determining that the first imager stream does not include sufficient information to identify the object, analyzing one or more frames of the second predetermined timeframe, the one or more frames captured prior to the trigger event.

23. The imaging device of claim 16, wherein the imaging device further operates in at least one of a theft prevention mode, a facial recognition mode, a signal identification mode, or an idle mode, and wherein the machine readable instructions include instructions that, when executed, cause the vision application processor to further:

(iii) when the imaging device operates in at least one of the theft prevention mode, the facial recognition mode, the signal identification mode, or the idle mode:

process the second imager stream without regard to any of the read session, the trigger event, or the decode event.

24. The imaging device of claim 23, wherein the imaging device operates in the idle mode and the machine readable instructions include instructions that, when executed, cause the vision application processor to further:

determine whether an object passes through the second FOV without a scan event occurring.

25. The imaging device of claim 23, wherein the imaging device operates in the theft prevention mode, and the machine readable instructions include instructions that, when executed, cause the vision application processor to further:

determine, based on the second imager stream, that the imaging device is in motion; and responsive to the determining that the imaging device is in motion, cause the imaging device to increase at least one of: (a) a framerate for the second imager stream or (b) a wireless signal range for the imaging device.

26. The imaging device of claim 16, wherein:

processing the second imager stream includes:

identifying a barcode associated with an object visible in the second FOV; and processing the first imager stream based on the second imager stream includes:

responsive to the identifying, causing the first imager to begin capturing the first imager stream.

27. The imaging device of claim 26, wherein processing the first imager stream based on the second imager stream further includes:

receiving one or more frames of the first imager stream, wherein the one or more frames include the barcode of the object in the first FOV;

decoding the barcode; and determining whether the object visible in the second FOV matches a reference associated with the barcode.

28. The imaging device of claim 16, wherein the imaging device further operates in at least one of an out-of-range mode or an RFID tag mode, and wherein the machine readable instructions include instructions that, when executed, cause the vision application processor to further:

(iii) when the imaging device operates in at least one of the out-of-range mode or the RFID tag mode:

process at least the portion of the first imager stream based on the at least one of the commencement of the read session, the trigger event, or the decode event.

29. The imaging device of claim 28, wherein the imaging device operates in the out-of-range mode and the machine readable instructions include instructions that, when executed, cause the vision application processor to further:

refrain from processing frames from the second imager stream.

30. The imaging device of claim 29, wherein refraining from processing frames includes:

causing the second imager to refrain from capturing the second imager stream while the imaging device is operating in the out-of-range mode.

31. A method for identifying an operation mode of an imaging device and processing imaging data based on the operation mode, the method comprising:

determining, at a vision application processor, whether an imaging device is operating in a handheld mode or a presentation mode;

(i) when the imaging device operates in the handheld mode:

processing at least a portion of a first imager stream and at least a portion of a second imager stream based on at least one of a commencement of a read session, a trigger event, or a decode event;

(ii) when the imaging device operates in the presentation mode:

processing the second imager stream without regard to any of the read session, the trigger event, or the decode event, and processing the first imager stream based on the second imager stream; and wherein the first imager stream is captured by a first imager operable to receive light from a first field of view (FOV) and the second imager stream is captured by a second imager operable to receive light from a second FOV.

* * * * *